United States Patent [19]
Badberg

[11] 3,856,316
[45] Dec. 24, 1974

[54] FUEL TANK FILLER NECK BREAKAWAY ASSEMBLY
[75] Inventor: Melvin C. Badberg, Lincoln, Nebr.
[73] Assignee: The Goodyear Tire & Rubber Company, Akron, Ohio
[22] Filed: Dec. 4, 1972
[21] Appl. No.: 312,064

[52] U.S. Cl. ............................................. 280/5 A
[51] Int. Cl. .......................................... B65d 39/00
[58] Field of Search ..... 280/5; 296/1 C; 220/24 GT, 220/1 V, 86 R

[56] References Cited
UNITED STATES PATENTS
2,570,818  10/1951  Kirkbride ..................... 220/86 R X
3,133,564  5/1964  Hunter ......................... 220/86 R X
3,478,922  11/1969  Mole .............................. 220/86 R Primary Examiner—Leo Friaglia
Assistant Examiner—Randall Schrecengost
Attorney, Agent, or Firm—F. W. Brunner; L. A. Germain

[57]  ABSTRACT

The integrity of a vehicle fuel tank is maintained in a crash situation by a filler neck assembly that maintains compression between the filler neck mounting flange, an outer cap flange disc, and an inner backing disc when the vehicle body material to which the assembly is mounted is ripped away on impact.

7 Claims, 5 Drawing Figures

PATENTED DEC 24 1974 3,856,316

FUEL TANK FILLER NECK BREAKAWAY ASSEMBLY

SUMMARY OF THE INVENTION

The invention generally relates to crash-proof vehicle fuel tanks and more specifically to breakaway filler neck and cap assemblies.

In the past few years, the Government has been concerned with consumer safety on the nation's highways and has passed stricter regulations concerning safety standards for vehicles. To meet the safety requirements imposed upon them, vehicle manufacturers have had to design their products with "crash worthiness" or "crash resistance" in mind and it is, therefore, a primary object of this invention to provide a fuel tank filler neck assembly that maintains its integrity in a crash situation.

It is another object of this invention to provide a filler neck assembly that is economical to manufacture, foolproof to assemble, and yet provides the crash-proof integrity required by safety regulations.

These and other objects and advantages which will become evident as the description proceeds are provided in a filler neck assembly comprising an elastomeric filler neck hose having a mounting flange, an inner supporting disc, and an outer cap retaining disc, the outer disc having a means thereon such that the compression mounting of the hose flange is maintained by the mounting screws even though the vehicle body material on which the filler neck assembly is mounted is ripped away.

DESCRIPTION OF THE DRAWINGS

The features of the invention may best be understood by reference to the description that follows in conjunction with the accompanying drawings in which.

DESCRIPTION OF THE PREFERRED EMBODIMENT

Figure 1:
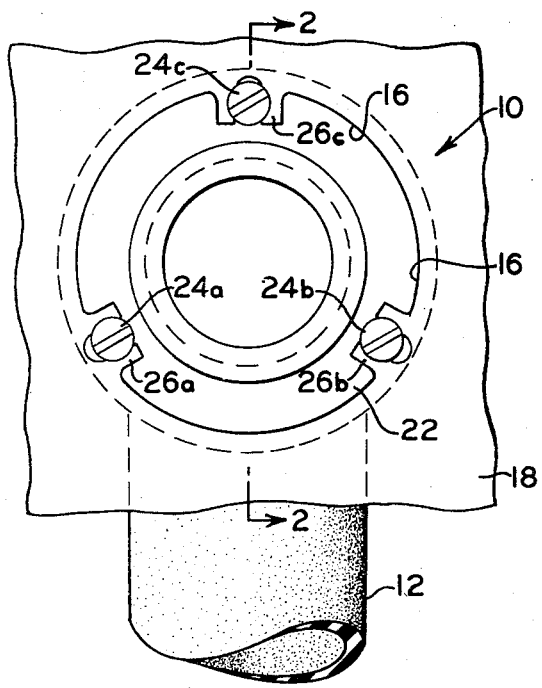
FIG. 1 is a front elevational view of filler neck assembly comprising the invention.
Figure 2:
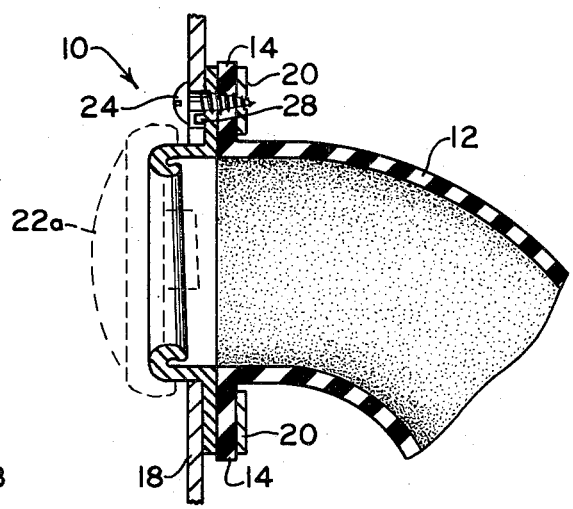
FIG. 2 is a sectional side elevational view taken on line 2—2 of FIG. 1.

In the drawings, there is illustrated a filler neck assembly generally indicated by reference number 10 and comprising a filler neck hose 12 having a flanged portion 14 to facilitate mounting to an inlet opening 16 in the panel 18 of a vehicle body. On the inner side of the hose flange 14, that is, the side adjacent the part of the hose connected to the fuel tank (not shown), there is a supporting disc 20 while on the outer side of the hose flange 14 there is a cap retaining disc 22. The cap 22a is shown in dashed lines to illustrate its relative position on the filler neck assembly. The filler neck hose flange 14, inner disc 20, and outer disc 22 are held in sandwiched arrangement by screws 24. For the purpose of this description, sheet metal, self-tapping screws are shown, however, any fastening means may be employed to meet the needs of the invention.

Figure 3:
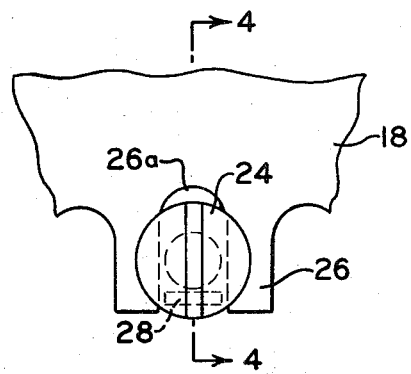
FIG. 3 is an enlarged top view illustrating the principle of the invention.

The assembly 10 is mounted to a vehicle body 18 by means of tabs 26, more clearly shown in FIGS. 1 and 3, which are provided for by the vehicle manufacturer and are located within the confines of the opening 16 in the vehicle body for receiving the filler neck. When shipped to the vehicle manufacturer, the assembly 10 is intact and held together by sheet metal screws 24a and 24b that are turned down enough to hold the parts 12, 20, and 22 together but not tightened enough to form a close fit. To install the filler neck assembly into a vehicle, the assemblyman hangs the assembly 10 onto tabs 26a and 26b of the vehicle body 18 from the inside with the cap retaining flange facing to the outside and locates the hole for screw 24c so that it may be driven home. Screws 24a and 24b are tightened to their full extent and the filler neck installation is complete.

An alternative to this method suggests that the assembly comprising the hose 12, inner disc 20, and outer disc 22 would be adhesively secured together for shipment to the vehicle manufacturer. In this arrangement the holes for the screws 24a, 24b, and 24c are in registration through the parts 12, 20, and 22 so that upon being mounted to the vehicle, the assemblyman merely registers the holes 24a, 24b, and 24c with the vehicle tabs 26, and drives home three mounting screws 24 such that the hose flange is mounted in compression.

Figure 4:
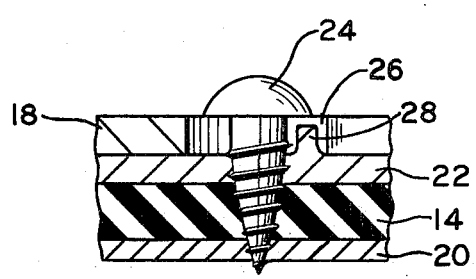
FIG. 4 is a sectional side view taken on line 4—4 of FIG. 3.

With respect to the breakaway feature of the filler neck assembly, there is provided on the outer disc 22 a protrusion 28 that is not quite equal to the total thickness of the vehicle body material 18 and is positioned adjacent the hole for each screw 24 so that it is under the screw head as shown in FIGS. 3 and 4. With the screws 24 turned down to rigidly mount the filler neck assembly to the vehicle body tabs 26, the filler neck hose flange is under sufficient compression to provide a leakproof and closed assembly by virtue of the sandwiched arrangement of discs 20 and 22. Now, in the event of damage to the vehicle panel 18 such that the mounting tabs 26 are ripped away from the mounting screws 24, the integrity of the closure, i.e., the compression of the discs 20 and 22 on the hose flange 14 is maintained because the protrusions 28 prevent such compression loss. It has been determined that with a rubber composition filler neck hose and hose flange 14, the protrusion 28 may be within the range of 60 percent to 90 percent of the vehicle panel material thickness. This will vary within the range, however, depending upon whether the vehicle body material is compressible such as in the case with a fiberglass body, or incompressible such as in the case of a steel body.

In the case of a steel body panel 18 and steel discs 20 and 22, and a rubber composition filler neck flange 14, it is determined that the protrusion 28 will maintain leak-proof and compression integrity when it is at least 75 percent of the body material thickness of the vehicle.

Figure 5:
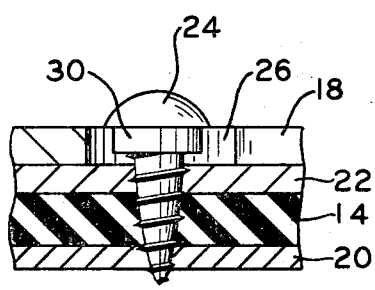
FIG. 5 is a sectional side view similar to FIG. 4 but illustrating another embodiment of the invention.

An alternative to the protrusion 28 on the filler neck cap disc 22 is shown in FIG. 5. In this embodiment, the screw 24 has a body collar 30 that will maintain compression integrity when the tab 26 is ripped away from the screw 24.

While certain representative embodiments and details have been shown in the drawings and alluded to in the description for the purpose of illustrating the invention, it will be apparent to those skilled in this art that various changes and modifications may be made therein without departing from the spirit or scope of the invention.

What is claimed is:

1. A breakaway fuel tank filler neck assembly adapted for attachment to the panel material of a vehicle body comprising:
   a. a flanged elastomeric filler neck hose having inner and outer flange surfaces; and
   b. means providing a capped end closure and including compression bearing surfaces mounted and cooperating with said flange surfaces to effect a sealing engagement therewith and providing attachment of the hose flange to the vehicle panel material such that the hose flange is in compression and to maintain the compression and sealing engagement should the filler neck assembly be disengaged from the vehicle panel material in a crash situation.

2. The filler neck assembly according to claim 1, wherein the means mounted and cooperating with said flange surfaces comprises:
   a. a support disc on the inner surface of the hose flange;
   b. a cap retaining disc on the outer surface of the hose flange; and
   c. fastening means to rigidly attach the assembly to the vehicle.

3. The filler neck assembly according to claim 2, wherein the cap retaining disc has a protrusion on the outside surface of a height less than the total thickness of the vehicle panel material and located under the fastening means to maintain compression of the hose flange upon disengagement with the vehicle panel material.

4. The filler neck assembly according to claim 2, wherein the fastening means comprises self-tapping screws having a wide collar portion under the screw head of a depth along the screw axis less than the thickness of the vehicle panel material to provide limited expansion of the compressed hose flange upon disengagement with the vehicle panel material.

5. In combination with a vehicle body panel material having a fuel tank filler neck receiving aperture therein, a breakaway fuel tank filler neck assembly comprising:
   A. an elastomeric filler neck hose having a flanged end for attachment to the vehicle panel material;
   B. a supporting disc on an inner surface of the hose flange;
   C. a cap retaining disc on an outer surface of the hose flange;
   D. fastening means securing the hose flange, supporting disc, and cap retaining disc to the vehicle panel material at the receiving aperture such that the supporting and cap retaining discs hold the hose flange in compression and effect sealing engagement therewith; and
   E. means on the filler neck assembly to maintain the hose flange in compression upon disengagement from the vehicle panel material such that said sealing engagement is maintained in a crash situation.

6. The assembly according to claim 5, wherein the means to maintain compression of the hose flange is a protrusion on the outside surface of the cap retaining disc having a height less than the thickness of the vehicle panel material and located under the fastening means.

7. The assembly according to claim 6, wherein the protrusion height is within the range of 60 to 90 percent of the vehicle panel material thickness.

* * * * *